E. J. BRANDT.
DESIGNATING, RECORDING, AND REGISTERING MECHANISM.
APPLICATION FILED MAR. 24, 1906.

941,005.

Patented Nov. 23, 1909.
6 SHEETS—SHEET 1.

Witnesses:
Fred Palm
Geo Feller

Inventor:
Edward J. Brandt
By Oliphant & Young
Attorneys.

E. J. BRANDT.
DESIGNATING, RECORDING, AND REGISTERING MECHANISM.
APPLICATION FILED MAR. 24, 1906.

941,005.

Patented Nov. 23, 1909.
6 SHEETS—SHEET 3.

E. J. BRANDT.
DESIGNATING, RECORDING, AND REGISTERING MECHANISM.
APPLICATION FILED MAR. 24, 1906.

941,005.

Patented Nov. 23, 1909.
6 SHEETS—SHEET 5.

Witnesses:
Fred Palm.
Geo. Felber.

Inventor:
Edward J. Brandt.
By Oliphant & Young
Attorneys.

E. J. BRANDT.
DESIGNATING, RECORDING, AND REGISTERING MECHANISM.
APPLICATION FILED MAR. 24, 1906.

941,005.

Patented Nov. 23, 1909.
6 SHEETS—SHEET 6.

UNITED STATES PATENT OFFICE.

EDWARD J. BRANDT, OF WATERTOWN, WISCONSIN, ASSIGNOR TO BRANDT CASHIER COMPANY, OF CHICAGO, ILLINOIS, A CORPORATION OF ILLINOIS.

DESIGNATING, RECORDING, AND REGISTERING MECHANISM.

941,005.   Specification of Letters Patent.   Patented Nov. 23, 1909.

Application filed March 24, 1906. Serial No. 307,788.

*To all whom it may concern:*

Be it known that I, EDWARD J. BRANDT, a citizen of the United States, and resident of Watertown, in the county of Jefferson and State of Wisconsin, have invented certain new and useful Improvements in Designating, Recording, and Registering Mechanism; and I do hereby declare that the following is a full, clear, and exact description thereof.

My invention has for its object to provide for recording sales in a merchantile establishment, as well as to provide for automatic registration of the sum total money value of the successively recorded sales, said invention consisting in what is herein shown, described and claimed as pertaining to a detachable implement comprising adjustable devices by which to indicate arbitrary designations and a machine in conjunction with the implement to record the indicated designations or to register sum total money value of a succession of cash transactions or both, said implement being also referred to hereinafter as a designator, said implement and machine being analogous to what is disclosed in my application Serial No. 259,130, filed May 6, 1905, and renewed January 29, 1908, Serial No. 413,268. The aforesaid implement is also analogous to what is set forth in my application Serial No. 307,787, filed March 24, 1906.

Figs. 8, 9 and 10 partly sectional view of details of the machine, and Fig. 11, a plan view of a sales-ticket or record sheet.

Figure 1:
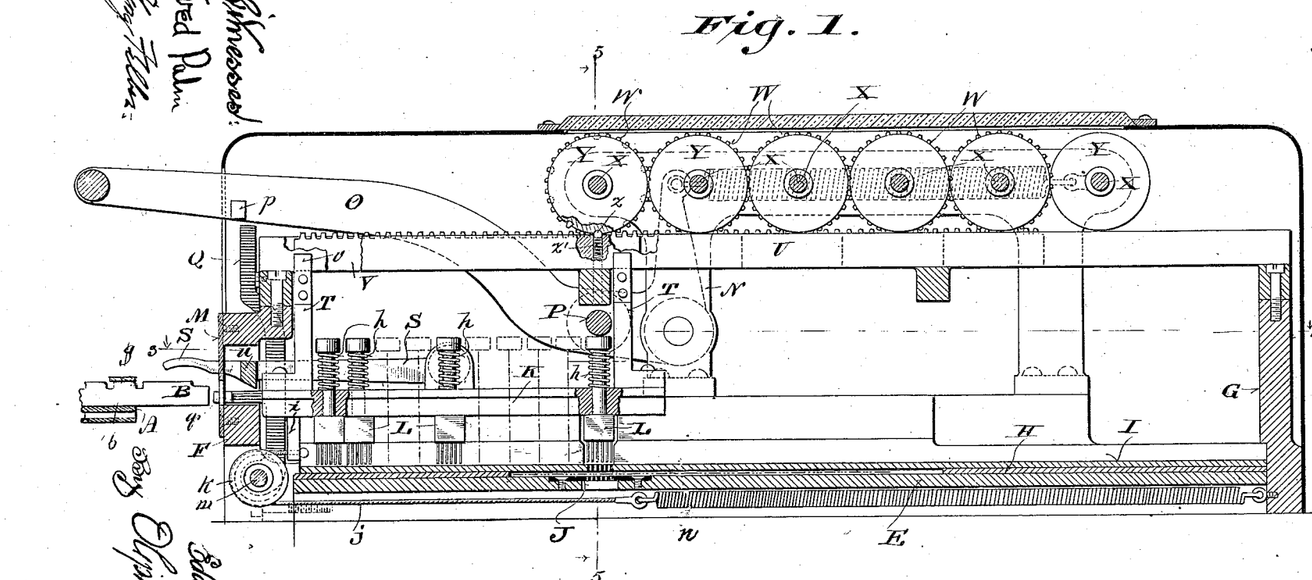
Figure 1 of the accompanying drawings represents a vertical longitudinal section view of a fragment of a preferred form of detachable implement or designator and a combined recording and registering machine in accordance with my invention, said view being indicated for the most part by line 1—1 in Fig. 2.
Figure 2:
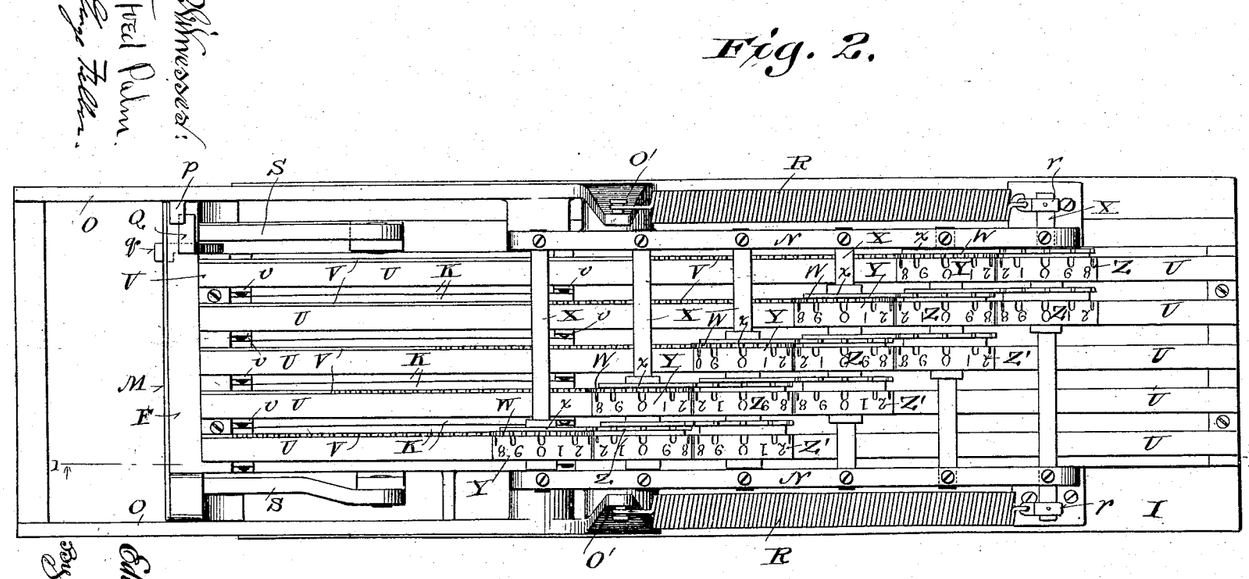
Fig. 2, a plan view of the machine.
Figure 3:
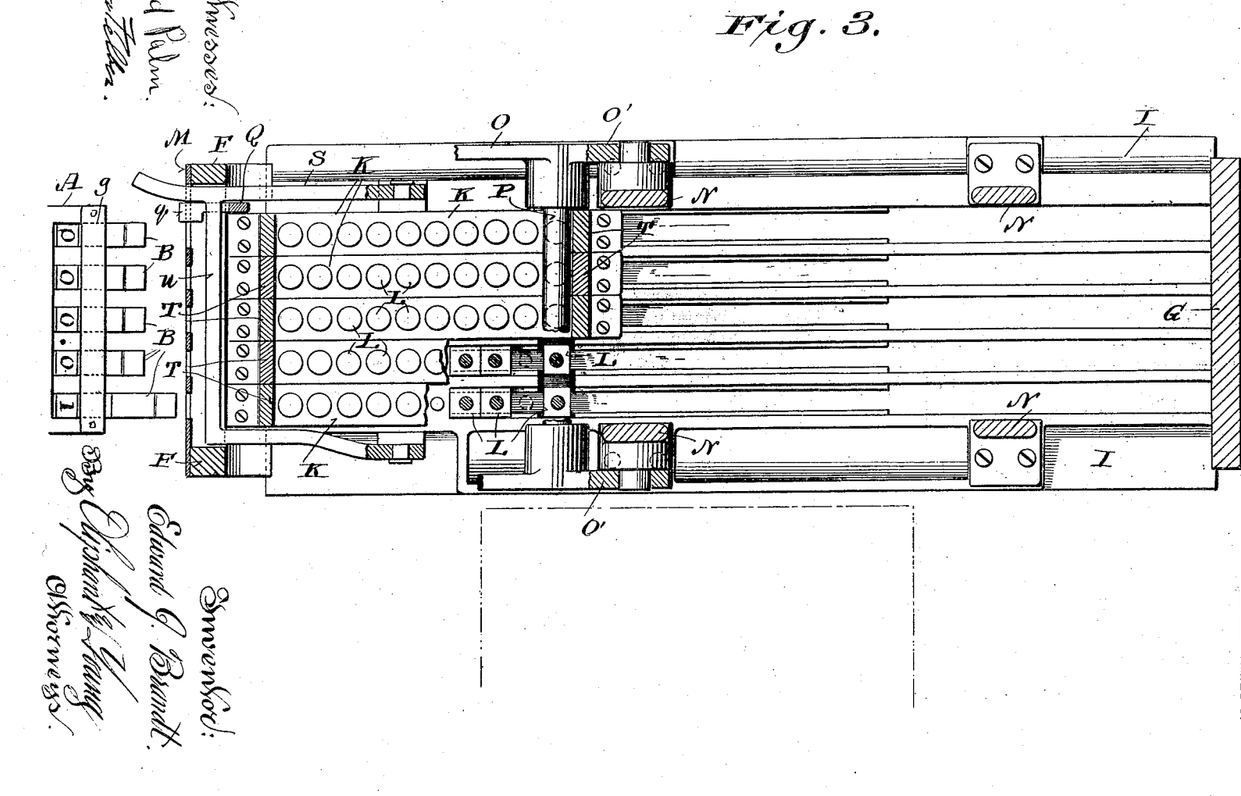
Fig. 3, a horizontal section view of the same indicated by line 3—3, parts being broken away and a fragment of the designator shown in plan.
Figure 4:
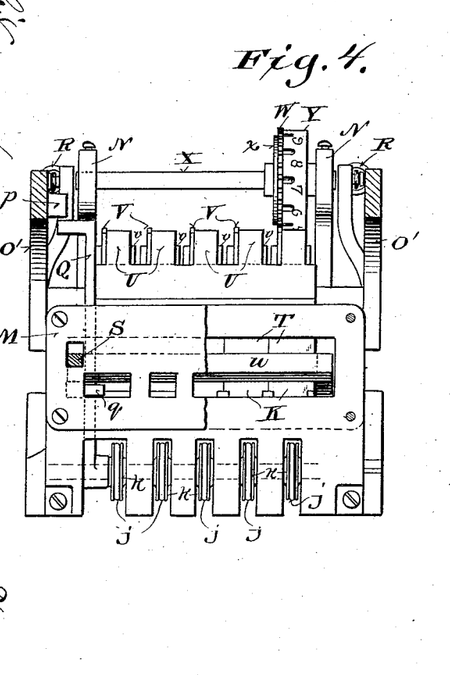
Fig. 4, an end view of the aforesaid machine partly in transverse section.
Figure 5:
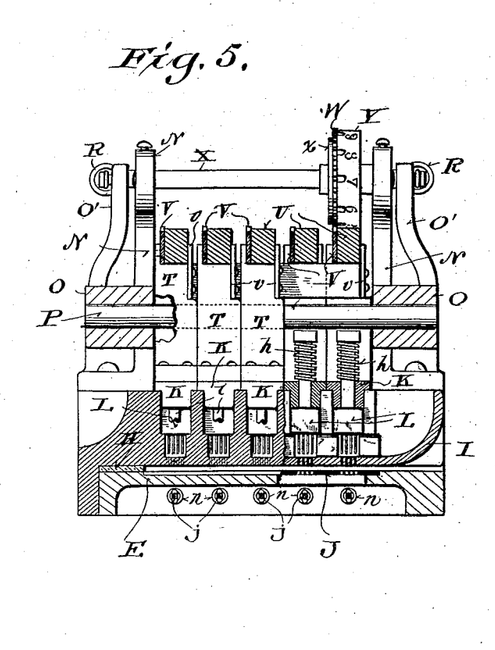
Fig. 5, a transverse section indicated by line 5—5 in Fig. 1.
Figure 6:
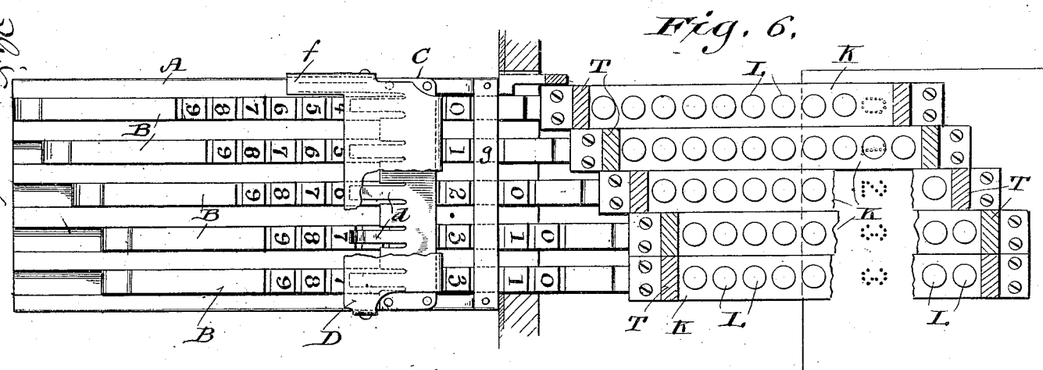
Fig. 6, a diagram illustrating the designator aforesaid having indicating devices thereof adjusted out of normal position, and devices of the machine correspondingly adjusted by means of said designator.
Figure 7:
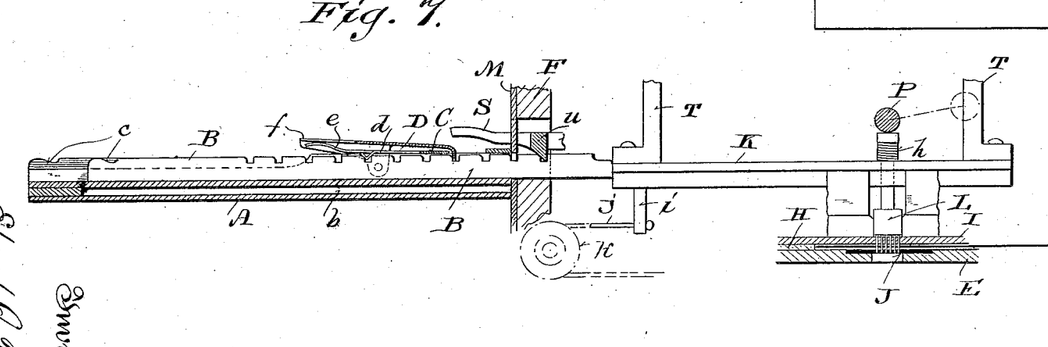
Fig. 7, a diagram illustrating a device of the machine adjusted by an indicating device of the designator and a perforating plunger carried by the former device, actuated to effect a record.
Figures 8, 9, 10, 11:
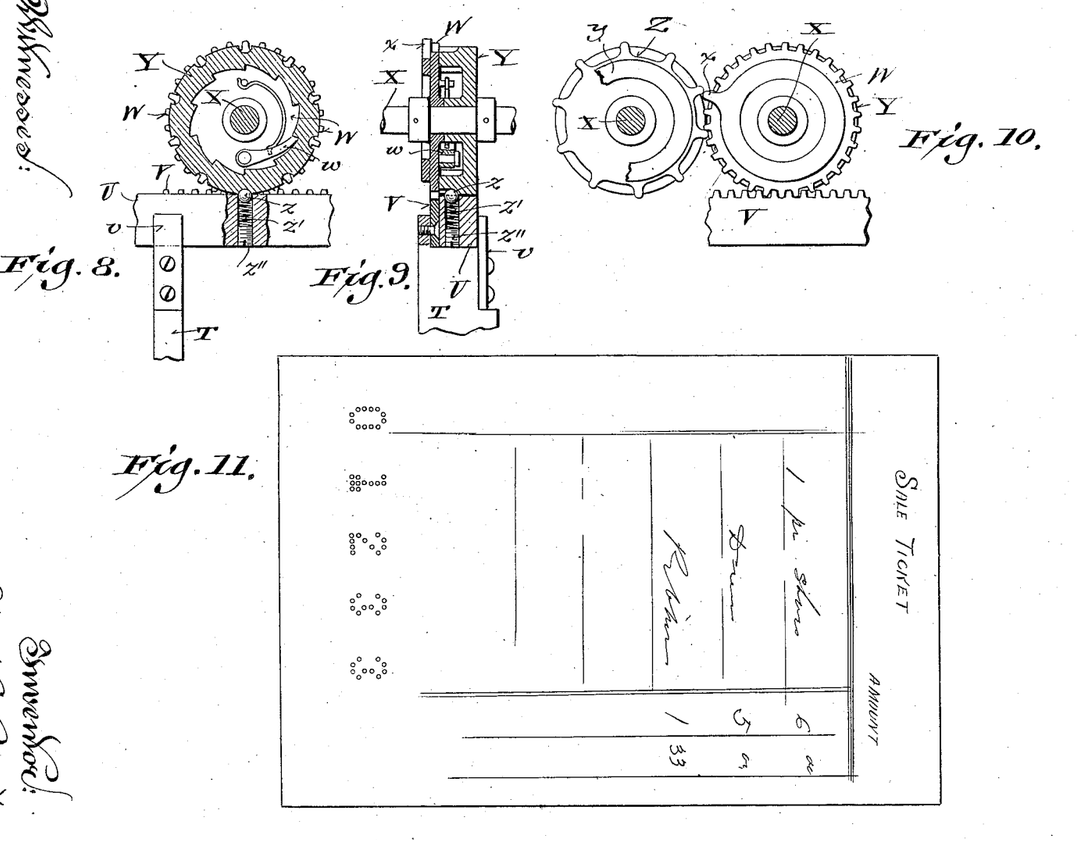

Referring by letter to the drawings, A indicates a tablet provided with a series of longitudinal grooves in which slides B have their play, and the tablet is shown as also preferably provided with a compartment $b$ in which to place sales-tickets. Each slide is shown provided at one end with a finger-notch $c$ to facilitate its adjustment, and the several slides are transversely kerfed at regular intervals longitudinally thereof for the engagement of catch-fingers $d$ of a spring-plate C riveted or otherwise fastened to the tablet, and an arm $e$ of this spring-plate opposes a thumb-extension $f$ of a latch-plate D in pivotal connection with said tablet and normally engaged with kerfs of all the slides, it requiring a tilt of the latch-plate, against resistance of said arm of the spring-plate, in order that any one or all of said slides may be adjusted out of normal position or back to the same. The catch-fingers of the spring-plate are such that each of them engages a kerf in a corresponding slide to hold said slide in any position of adjustment when the latch-plate is tilted out of kerfs of all of the several slides, there being ready yield of said latch-fingers to adjustment of the respective slides. It is preferable to mark the spaces between kerfs of each slide with the Arabic numerals in ascending order beginning with the cipher, and the slides themselves are in the order of units, tens, hundreds etc., reading from right to left of the tablet when the same is held with the thumb-notches of said slides toward the operator. All the slides are of the same length and when in normal position they all project an equal distance from one end of the tablet in which they are adjustable. The tablet, slides and other devices in connection therewith constitute the portable implement or designator to which reference is had herein. An adjustment of one or more of the slides out of normal position is made to designate the total money value of a sale. For instance twelve dollars thirty-three cents is designated by an adjustment of the units, tens, hundreds and thousands slides to the positions shown in Fig. 6, the working ends of each adjusted slide being as many steps or spaces out of normal position as corresponds to the numeral thereon or space thereof next back of an upper cross-strip $g$ of the tablet at the forward extremity of same. The adjustment of proper slides having been effected, the designator is ready to be fed to a machine that is herein shown and described as a combined register and recorder, but which may be either.

In practice there will be one machine that may be served by an indefinite number of designators, one after the other, and a ticket, (single, duplicate, triplicate or otherwise) having the sale item or items marked thereon may accompany each designator to the machine to have the sum total money value of sale recorded thereon, or the recording may be done on a strip or sheet of suitable material, preferably paper, independent of the ticket or on both as may be most convenient or desirable.

The machine is herein shown as consisting of a frame comprising a base E and end standards F, G, in connection with the base. Spacers H are set on the base and a bed I, surmounting the spacers, has depending flanges lapping the longitudinal edges of said base. This bed is provided with a series of longitudinal counter-sunk grooves, and a single transverse groove intercepting the ones aforesaid. The bottom of the transverse groove is punctured at its intersections with the longitudinal grooves to permit the passage of the depending pins of perforating-punches hereinafter more particularly specified, and set in a recess of the base, flush with the top of same, is a perforated die-plate J over a transverse aperture in said base, the perforations in this plate being alined with those of the bed I aforesaid. Between the base E and bed I, a space is provided under the perforated die-plate J and this space is open at one side of the machine for the introduction of one or more sales-tickets or a sheet or strip in which to punch a record, the bed I being preferably flared adjacent to said space to facilitate the insertion of the ticket, sheet or strip in said machine.

Supported on ribs that alternate with the longitudinal grooves of the bed I are flanged slides K, that engage the upper wider portions of said grooves. Guided in each of these slides are headed vertical shanks of a series of perforating punches L, and spiral-springs $h$ are arranged, under tension, between each slide and the heads of the punch-shanks therewith. There are ten perforating punches in conjunction with each of the slides K, and the spacing of same corresponds to that of the spacing of the slides B of the designator aforesaid, said slides and punches therewith or their equivalents being hereinafter referred to as indicator mechanisms. Each of the punches L is supported by and has travel on the shoulders of the corresponding longitudinal groove in the bed I, except when it is alined with the transverse groove in said bed, and this transverse groove is made flaring lengthwise thereof at its upper end to guide the punches when the same are depressed against spring-resistance, whereby accurate alining of the depending pins of said punches with corresponding perforations in the die-plate J is assured, the arrangement of the pins of each punch being such as to outline an Arabic numeral. In the arrangement shown the cipher-punch of each slide K is normally alined with said transverse groove of the bed I and extremities of all the slides are normally alined at one end of the machine parallel to an aperture in the frame-standard F, which aperture is faced by a plate M having guide-openings therein for the slides B of the aforesaid designator, there being as many machine slides as there are designator slides and in the same arrangement with respect to units, tens etc.

Depending from each slide K of the machine is a lug $i$ to which is connected one end of a cord $j$ that engages a pulley $k$ in a vertical bottom recess of the standard F on an arbor $m$ set in said standard, the other end of the cord being connected to a spiral-spring $n$ attached to the standard G under the base A of the machine frame. The tension of the spring is such that the slide is automatically returned to normal position subsequently to movement of same to bring a digit-punch therewith into register with the transverse groove of said frame, the digit-punches of each slide being in ascending order from the cipher-punch that is normally positioned as aforesaid. Each slide is limited in its return movement, by the opposition of the frame-standard F to the lug $i$ of said slide.

Fast on the bed I aforesaid are parallel side standards N, and fulcrumed on studs of these standards are the ends of a lever-yoke O having an impact-bar P for the punches that are at any time alined with the transverse groove in said bed. A vertical rocker Q is loose on the arbor $m$ and its upper end is normally in the path of a lug $p$ of the lever-yoke to ordinarily prevent downward throw of same but a lug $q$ of the rocker extends through an aperture in the plate M to be in the path of the tablet A of the designator aforesaid when the slides B of said designator are engaged with the machine in opposition to extremities of the punch-carrying slides K of same. The movement of said tablet against the lug of the rocker results in clearance for the lug of the lever-yoke, and the latter may then be swung down to cause the impact-bar P thereof to actuate the punches alined over the transverse groove in the bed I, the result being a perforating of a sale-ticket, sheet or strip in the machine to make a permanent record of what has been previously indicated by the aforesaid designator, it being understood that machine-slides are propelled by designator-slides, adjusted out of normal position, in order to bring predetermined digit-punches into position to be impacted against an opposing ticket, sheet or strip to thereby obtain said record. The downward swing of the lever-yoke is against resistance of spiral-springs R connecting arms O' of said yoke with collars r fast on extensions n of one of a series of arbors constituting parts of the machine.

A gravity catch-yoke S is in pivotal connection with vertical ears t of the bed I to engage with alined kerfs of the designator-slides B, and thereby prevent retraction of the designator itself until said yoke is lifted clear of said kerfs. The construction of the catch-bar u of the aforesaid yoke is such that it does not interfere with the insertion of said slides their full distance out of normal position into the machine. However there will be no retaining engagement of the catch-yoke with designator-slides, except some one or all of these slides be adjusted out of normal position.

Each slide K of the machine is provided with posts T notched at their upper ends for the engagement of the longitudinal bars of a grid U that is fastened at its ends, by screws or other suitable means, to the frame-standards F, G, and said grid-bars are parallel to the longitudinal grooves of the bed I and are over the same. Fast to the posts, in the upper end notches of same, parallel to the longitudinal grid-bars, with which they have sliding contact, are racks V, and said posts are provided with detachable guard-fingers v that flank said grid-bars in sliding contact with the sides of same farthest from the racks. Each rack is engaged by a pinion W loose on one of a series of arbors X fast in the side standards N, and a pawl w in spring-controlled pivotal connection with a side of each pinion engages a ten-tooth inner annular ratchet of an adjacent units register-wheel Y, said pinion being provided with a tappet x that engages, once in each revolution, with a tens-register-wheel Z loose on the arbor next the one on which the aforesaid pinion is centered. This tens-register-wheel is likewise provided with a tappet y that engages, once in each revolution, with a hundreds register-wheel Z' loose on still another of the arbors aforesaid, and the register-mechanism actuated by each of the racks V may be carried on indefinitely, there being an independent register that coacts with the movement of each slide K in the machine out of normal position a distance equal to the companion slide B of the portable implement or designator aforesaid, and the arrangement of the register-wheels is such that those indicating tens of cents are all on one arbor, those indicating hundreds of cents on another arbor, and so on up to the highest multiple of cents for which the register-mechanism is designed, in order to facilitate the casting up of the total registration of the machine at any time. In taking off the total amount registered, the amount indicated by the units register-wheel for cents is first noted, the unit of the sum indicated by the register-wheels for tens of cents next noted to the left of the previous notation and the tens of the sum (if such there be) carried over into the addition of the sum indicated by the register-wheels for hundreds of cents, the unit of this sum noted to the left of that for tens of cents and so on until the sum indicated by the register-wheels for the highest numeral order of cents is noted in full to the left of the previous notations, the reading of all the notations being the grand total in cents, and decimally dollars and cents of the registration effected by the machine in coöperation with designators similar to that herein shown and described. The pawl engaging the ratchet of the units-wheel of each register prevents back movement of said wheel, and each of the several register wheels is provided with outer concave notches alined with the numerals thereon. These notches are successively engaged by balls z supported on spiral-springs z' under tension in sockets provided in the longitudinal bars of the grid aforesaid. For convenience and economy in manufacture of the machine, the grid-bars are bored, screw-tapped and plugged by screws z'' to form the sockets for the ball-supporting springs. By means of the engagement of the balls with concave notches of the register-wheels, overrunning of said wheels is prevented without interference with their drive in the proper direction. The several register wheels and rack engaging pinions are held in proper position lengthwise of the several arbors between collars or other suitable stops in rigid connection with said arbors.

The elements of the machine above specified are for the most part inclosed by a suitable casing preferably glazed over the register-mechanism.

It is within the scope of my invention to provide for printing or embossing the records, and various changes of detail in the portable implement and machine above specified may be made without departure from said invention as regarding a broad interpretation of the same.

I claim:—

1. A machine comprising adjustable recording mechanisms; a detachable tablet provided with longitudinal guideways, and slides adjustable in the guideways to extend beyond an end of the tablet and determine the adjustment of the mechanisms aforesaid when engaged with said machine.

2. A machine comprising register mechanisms; a detachable tablet provided with longitudinal guideways, and slides adjustable in the guideways to extend beyond an end of the tablet and determine the operation of the mechanisms aforesaid when engaged with said machine.

3. A machine comprising adjustable recording mechanisms and registering mechanisms; a detachable tablet provided with longitudinal guideways, and slides adjustable in the guideways to extend beyond an end of the tablet and determine an adjustment of the recording mechanisms as well as the operation of the registering mechanisms when engaged with said machine.

4. A detachable tablet provided with longitudinal guideways, slides adjustable in the guideways to extend beyond an end of the tablet and indicate money value, and a machine comprising adjustable indicating mechanisms each of which has its adjustment determined by an adjusted slide engaged with said machine, and means coöperative with adjusted indicating mechanisms for recording values primarily indicated by means of said slides.

5. A detachable tablet provided with longitudinal guideways, slides adjustable in the guideways to extend beyond an end of the tablet as means for indicating money value in varying amounts, and a machine comprising intermittently coactive register-mechanisms in position to be operated by adjusted slides engaged from time to time with said machine, whereby a total of a plurality of values primarily indicated by means of said slides is obtained.

6. A detachable tablet provided with longitudinal guideways, slides adjustable in the guideways to extend beyond an end of the tablet as means for indicating money value in varying amounts, a machine comprising adjustable indicator mechanisms in position to have their adjustment determined by adjusted slides engaged with said machine, means coöperative with adjusted indicator mechanisms for recording values primarily indicated by means of said implement, and register mechanisms operative in conjunction with the adjustment of said indicator mechanisms to total a plurality of values primarily indicated by said slides.

7. A detachable tablet provided with longitudinal guideways, slides adjustable in the guideways beyond an end of the tablet, and a machine comprising recording devices in movable series arranged to be adjusted by adjusted slides engaged with said machine, and means for impacting alined recording devices of the several series.

8. A detachable tablet provided with longitudinal guideways, slides adjustable in the guideways beyond an end of the tablet, and a machine comprising register mechanisms as well as recording devices in movable series arranged to be adjusted by adjusted slides engaged with said machine, and means for impacting alined recording devices of the several series.

9. A machine comprising recording devices in movable series automatically retractive, a detachable tablet having longitudinal guideways and slides adjustable in the guideways beyond an end of the tablet to determine adjustment of the recording devices aforesaid when engaged with the machine.

10. A machine comprising automatically retractive slides, a series of similarly retractive punches of denominations in ascending order from naught to nine inclusive carried by each slide; and means for impacting alined punches of all the slides; and a detachable implement comprising adjustable slides by which to determine adjustment of the slides aforesaid when engaged with said machine.

11. A machine comprising automatically retractive slides, means for holding the slides in adjusted position without interference with adjustment, a series of similarly retractive punches of denominations in ascending order from naught to nine inclusive carried by each slide, lever-mechanism for impacting alined punches of all the slides, and a movable stop for preventing indiscriminate action of the lever-mechanism; in combination with a detachable implement comprising adjustable slides by which to trip said stop and determine adjustment of the slides aforesaid when engaged with said machine.

12. A machine comprising a base, a bed spaced over the base, and having a series of longitudinal grooves and a transverse groove intersecting the longitudinal ones the transverse groove being apertured through its bottom at the intersections, automatically retractive slides engaging the longitudinal bed-grooves, similarly retractive punches of denominations in ascending order from naught to nine inclusive carried by each slide for separate registration with the transverse groove in said bed, and means for impacting alined punches of all the slides to depress the same through said transverse groove; in combination with a detachable implement comprising adjustable slides by which to determine adjustment of the slides aforesaid when engaged with said machine.

13. A machine having a base provided with a die-plate, a bed spaced over the base and having a series of longitudinal grooves and a transverse groove intersecting those aforesaid, the bottom of this transverse groove being apertured at the intersections over the die-plate, automatically retractive slides engaging the longitudinal bed-grooves, similarly retractive punches of denominations in ascending order from naught to nine inclusive carried by each slide for separate registration with the transverse bed-groove, and means for depressing alined punches; in combination with a detachable implement comprising adjustable slides by which to determine adjustment of the slides aforesaid when engaged with said machine.

14. A machine comprising a base provided with perforations, a bed spaced over the base and having a series of countersunk longitudinal grooves and a transverse groove intersecting those aforesaid, the bottom of this transverse groove being perforated at the intersections over the base-perforations in match with same, automatically retractive slides engaging the longitudinal bed-grooves, similarly retractive punches carried by the slides and normally supported on shoulders of said longitudinal bed-grooves but separably registrable with the transverse bed-groove and each having depending perforating pins in outline of a numeral registrable with perforations of the bed and base, and means for depressing punches alined over said transverse bed-groove; in combination with a detachable implement comprising adjustable slides by which to determine adjustment of the slides aforesaid when engaged with said machine.

15. A machine comprising a bed provided with longitudinal grooves and a transverse groove intersecting the grooves aforesaid, this transverse groove being apertured through its bottom at the intersections, slides engaging the longitudinal bed-grooves, a series of automatically retractive punches of denominations from naught to nine inclusive carried by each slide for separate registration with the transverse bed-groove, means for impacting alined punches of all the slides, a rack in connection with each slide, a pinion arranged to engage the rack and a primary register-wheel in connection with the pinion to rotate therewith in but one direction, in combination with a detachable implement comprising adjustable slides by which to determine adjustment of the slides aforesaid when engaged with said machine.

16. A machine comprising a grid having longitudinal bars as parts of same, slidable racks supported by the grid parallel to its longitudinal bars, a pinion engaging each rack, a primary register-wheel in connection with the pinion to rotate therewith in but one direction, and a slide connected to each rack; in combination with a detachable tablet provided with longitudinal guideways and slides adjustable therein to extend beyond one end of the tablet itself for engagement with the machine to determine adjustment of its connected slides and racks.

17. A machine comprising a grid, racks supported by the grid parallel to longitudinal bars of same, a pinion engaging each rack, independent trains of register-wheels having the primary wheel of each in connection with a rack-engaging pinion to rotate therewith in but one direction, balls having spring-support in sockets with which said grid-bars are provided to engage recurring concave notches in the register-wheels, and a slide connected to each rack; in combination with a portable implement comprising adjustable slides by which to determine adjustment of the slides aforesaid when engaged with said machine.

18. A machine having a series of independent register-mechanisms comprising wheels so arranged that those indicating tens in the several mechanisms are on the same arbor, those indicating hundreds on another arbor and so on up to the highest multiple of the unit; and a detachable implement comprising devices corresponding to said mechanisms and each adjustable to determine an operation of the relative register mechanism.

In testimony that I claim the foregoing I have hereunto set my hand at Chicago in the county of Cook and State of Illinois in the presence of two witnesses.

EDWARD J. BRANDT.

Witnesses:
SAMUEL N. POND,
FREDERICK C. GOODWIN.